United States Patent [19]
Hörmann et al.

[11] 3,989,326
[45] Nov. 2, 1976

[54] TAPERED-ROLLER BEARING WITH MASSIVE CAGE

[75] Inventors: Karl Hörmann, Dittelbrunn; Hans Köber, Schwebheim, both of Germany

[73] Assignee: Kugelfischer Georg Schäfer & Co., Schweinfurt, Germany

[22] Filed: May 15, 1975

[21] Appl. No.: 577,672

[52] U.S. Cl. .................................. 308/218; 308/214
[51] Int. Cl.² .......................................... F16C 33/00
[58] Field of Search .................... 308/184, 214, 218

[56] References Cited
UNITED STATES PATENTS

| | | | |
|---|---|---|---|
| 1,982,896 | 12/1934 | Ackerman | 308/218 |
| 2,658,807 | 11/1953 | Wallgren | 308/218 |

*Primary Examiner*—Kenneth H. Betts
*Assistant Examiner*—Richard A. Bertsch
*Attorney, Agent, or Firm*—Karl F. Ross; Herbert Dubno

[57] ABSTRACT

The tapered-roller bearing has an inner race formed with a groove having a frustoconical base on which is provided an array of rollers that also engage a frustoconical surface on an outer race. A cage comprising a ring lies on one of the ledges defining grooves in the inner race and has a plurality of spacer elements engaged between the rollers and formed with ledges overreaching the groove-forming ridge of the inner race and preventing axial displacement in one direction by engagement of the bases of the pockets formed between the spacer elements with the wide ends of the tapered rollers. The spacer elements are formed at their ends distant from the ring body with enlarged heads fitted to the tapered rollers and holding them in place on the inner race.

5 Claims, 3 Drawing Figures

TAPERED-ROLLER BEARING WITH MASSIVE CAGE

FIELD OF THE INVENTION

The present invention relates to a roller bearing and, more particularly, to a cage for a high-speed tapered-roller bearing.

BACKGROUND OF THE INVENTION

A tapered-roller bearing (See German Offenlegungsschrift Nos. 2,229,567 and 2,142,472) usually comprises an outer race, an inner race received within the outer race formed with a radially outwardly projecting ridge, an array of frustoconical rollers riding between these two races and having large-diameter ends turned toward the ridge of the inner race, and a cage that maintains a predetermined angular spacing between the rollers. At least one of the races is formed with means for feeding lubricant to the rollers.

The case is usually made of sheet metal and is supported or guided by the axial faces of the two races in systems where high speeds are encountered so that the adverse effect of centrifugal force can be countered. It is therefore necessary to provide particular guide surfaces and holders on the cage in order to insure its proper centering.

So-called massive cages have also been used in order to provide a larger contact surface between the cage and the rollers. The windows in this cage which receive the individual bearings are usually closed by a separate cage element that is riveted to a comb-type cage arrangement so as to close these windows and form a rigid assembly. In use however it has been found that the rivets create an eccentric center of gravity, and frequently loosen so as to make the entire assembly useless.

OBJECTS OF THE INVENTION

It is an object of the present invention to provide an improved roller bearings.

Another object is the provision of an improved cage for a taper-roller bearing.

Yet another object is the provision of such a cage which is relatively inexpensive to manufacture, but which overcomes the disadvantages both of the hitherto known massive cages and the edge-guided cages.

SUMMARY OF THE INVENTION

These objects are attained according to the present invention in a high-speed roller bearing having a massive comb-like cage of highly rigid material which is formed of a main body having an inner surface adjacent and guided by the outer radial face of the ridge formed on the inner race and with an end surface lying against and guided by the wide ends of the rollers. A plurality of unitary spacer elements extend axially from the body between the rollers, each spacer elements having a circumferentially enlarged head at its end turned away from the body and being formed with a ledge overreaching and engaging axially against the axial face of the ridge on the inner race. Thus axial displacement of the cage in one direction is prevented by these ledges which engage against the ridge on the inner race, whereas the axial displacement in the opposite direction is prevented by engagement of the roots or bases of the pockets formed between the spacer elements of the comb against the wide ends of the rollers. Proper radial positioning is insured by close fitting and guiding between the inner surface of the main body of the cage and the outer surface of the ridge on the inner race. The spacer elements are all of like rigidity and mass so that centrifugal forces do not unbalance the assembly when it is rotated at high speed.

With the system according to the present invention it is possible for the bearing to rotate at extremely high speed. The extremely accurate radial and axial guiding as the cage on the inner race allows this high speed use, and the rigidity of the spacer elements prevents them from spreading more than a nominal and acceptable amount due to centrifugal forces on rotation of the cage at such high angular speeds. According to this invention the spacer elements each have a circumferentially enlarged head so that it is possible to form them with a relatively simple machining tool and to maintain the radius or fillet between the spacer elements and the base of the pockets of the cage relatively large. Thus the device is extremely strong. With proper choice of the thickness of the spacer elements, the length thereof, and the fillet radius at the base of these spacer elements it is possible to produce bearings rated at high speeds hitherto unobtainable with massive cages.

In this manner, since the lengths of the rollers are somewhat smaller than the groove on the inside race in which they are received, it is possible to make an assembly where the cage and the inner race alone can hold the rollers in place, as the circumferential enlargements of the spacer elements of the cage hold these rollers. During assembly of the bearings these enlargements can be pushed apart and allowed to snap elastically back into place around the rollers. This arrangement makes it possible to partially disassemble the bearing, remove one of the rollers, and examine the inner race. Such a possibility is extremely advantageous when the bearing is used in a jet engine or the like for extremely high speeds on counters and periodic inspection is essential. The enlargement of the outer ends of the spacer elements minimizes the contact area between the rollers and the cage and maintains these rollers in proper position with a minimum of friction. In use the cage serves merely to hold the rollers apart, the radial positioning of the cage being insured by the lubricant on the outside of the inner race.

According to the present invention at least one lubrication hole extends radially through the inner race. In this manner it is possible to coat the rollers and the pockets in the cage that engage the rollers, as well as the surfaces of the inner race and cage which engage one another.

BRIEF DESCRIPTION OF THE DRAWING

The above and other objects, features, and advantages of the invention will become more readily apparent from the following description, reference being made to the accompanying drawing in which.

SPECIFIC DESCRIPTION

Figure 1:
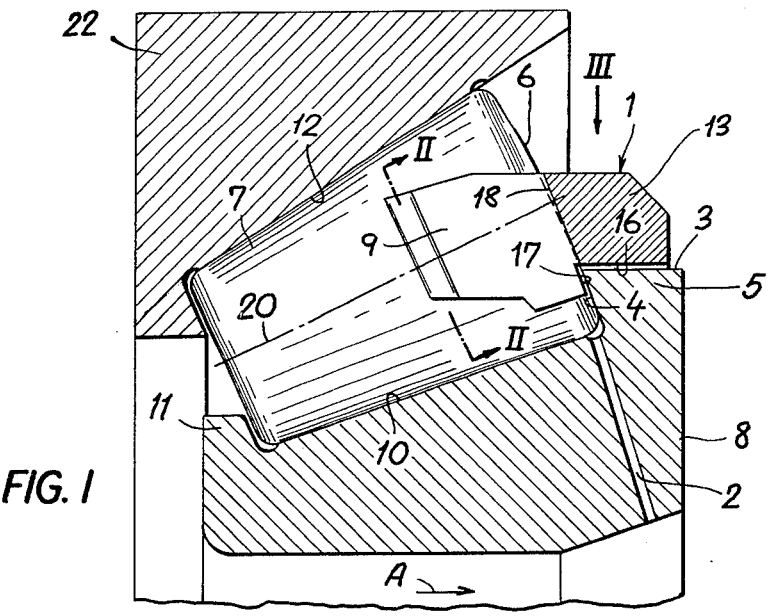
FIG. 1 is a radial section through a bearing according to the present invention.

According to the present invention a high-speed bearing basically comprises an inner race 8, an outer race 22, an array of rollers 7 between the races 8 and 22, and a cage 1 that circumferentially spaces the rollers 7. The inner race 8 is formed with a groove 10 having a base formed as a frustoconical surface and defined between a pair of ridges 11 and 5. The outer race 22 has a frustoconical surface 12 against which the outer surfaces of the frustoconically tapered rollers 7 lie.

The cage 1 is formed basically as an annular ring 13 made of steel and from which project, comb-fashion, a plurality of parallel spacer elements or fingers 9 which extend between and embrace the wide ends of the tapered roller 7. The ring part 13 has a cylindrical inner surface 16 which is spaced slightly radially outwardly from the cylindrical outer surface 3 of the ridge 5. In addition the fingers or spacer elements 9 are formed with ledges 17 that overreach this ridge 5 and engage flatly against the inside frustoconical surface 4 of this ridge 5. A surface 18 of the body 13 engages against the wide ends 6 of the rollers 7 and is also frustoconical. Thus angular displacement of the cage 1 in the direction of arrow A is prevented by engagement of the surface 4 against the end surfaces 17. Displacement in the opposite axial direction is prevented by engagement of the surfaces 18 against the surfaces 6, and the radial position of the cage 1 is maintained by the lubrication between the surfaces 16 and 3.

Figure 2:
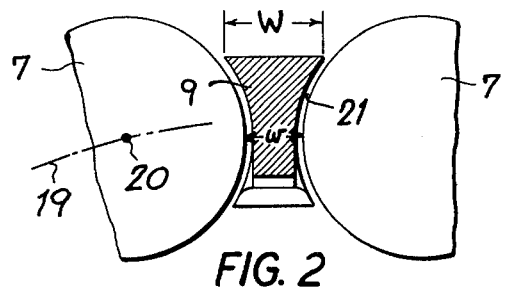
FIG. 2 is a section taken along line II—II of FIG. 1.
Figure 3:
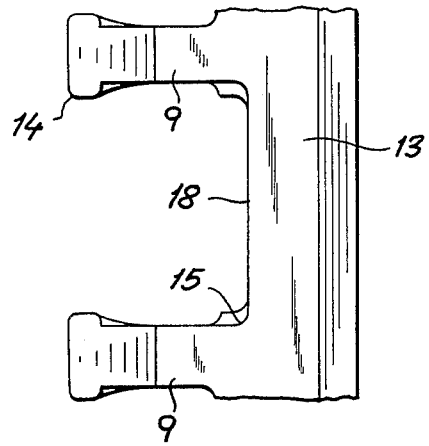
FIG. 3 is a view taken in the direction of arrow III of FIG. 1 of a detail of the cage according to the present invention.

The spacer elements 9 have enlarged free ends or heads 14 which as shown in FIG. 2 are formed outwardly of an imaginary frustocone 19 including the central axes 20 of the rollers 7 with frustoconical surfaces 21 having centers of curvature lying at the respective axes 20 and being of a greater maximum width W than the distance w between the rollers 7. Thus radial displacement of the rollers 7 outwardly through the cage 1 is inhibited. Radially within this imaginary frustocone 19 the spacer elements 9 are similarly concave.

The spacer elements 9 are all unitarily formed with the steel outer ring 13 and fillets 15 are provided at the juncture between the two so that maximum rigidity and minimum deformation on high-speed spinning of the inner race 8 is obtained. A lubrication hole 2 is provided with openings at the corner between the surfaces 4 and 10 so as to insure complete lubrication of the bearing.

We claim:
1. A high-speed roller bearing comprising:
an annular outer race centered on an axis;
an annular inner race concentrically within said outer race and formed with a radially outwardly projecting ridge having an axially extending face and a radially extending face;
an array of like tapered rollers between said races and having ends lying against said radially extending face; and
a unitary comblike cage of highly rigid metallic material between said races and having an annular main body formed unitarily with an inner surface coaxially surrounding and guided by said axially extending face of said ridge, respective surfaces lying against and guided by said ends of said rollers, and a plurality of elongated spacer elements unitary with said body and separated by said surfaces, said spacer elements extending axially from said body between said rollers, each spacer element having a circumferentially enlarged head at a free end turned away from said body and being formed with an inwardly projecting ledge overreaching and engaging axially against said radially extending face of said ridge, said elements having the same strength with respect to centrifugal acceleration forces, said inner race being formed with a radially outwardly opening groove at least partially defined by said ridge and having a frustoconical base surface on which said rollers lie.

2. The bearing defined in claim 1 wherein said metal is steel.

3. The bearing defined in claim 1 wherein said rollers are spaced apart by a predetermined circumferential distance, said heads each having a maximum circumferential width greater than said distance.

4. The bearing defined in claim 3 wherein said heads are of said width in a region lying outside an imaginary frustocone centered on said axis and defined by the axes of said rollers.

5. The bearing defined in claim 3 wherein the cross-sectional dimensions of said spacer elements decreases away from said body.

* * * * *